Oct. 24, 1967  G. R. MAYNARD  3,349,158
METHOD AND APPARATUS FOR MAKING MOSAICS
Original Filed Sept. 24, 1962  3 Sheets-Sheet 1
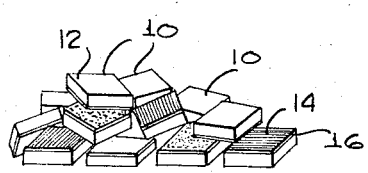
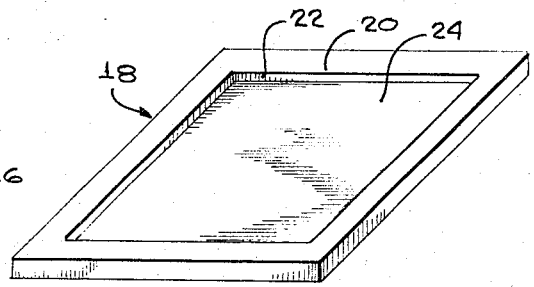
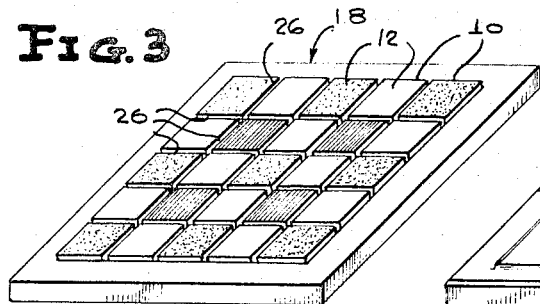
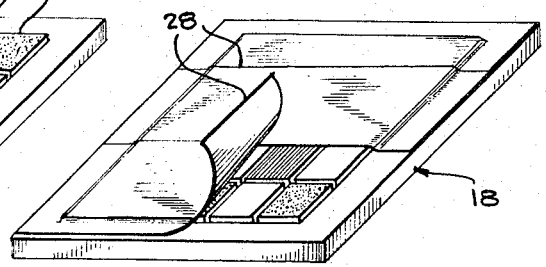
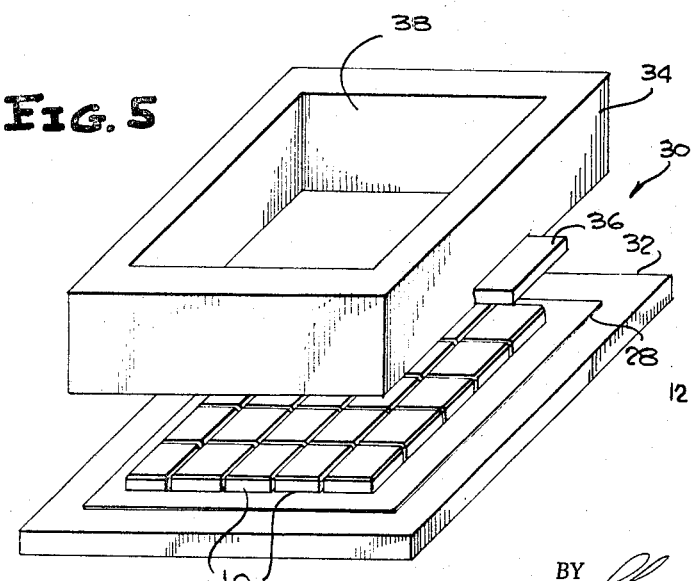
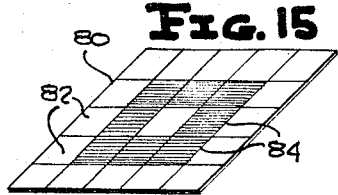
INVENTOR
GEORGE R. MAYNARD
BY Shoemaker and Mattare
ATTORNEYS

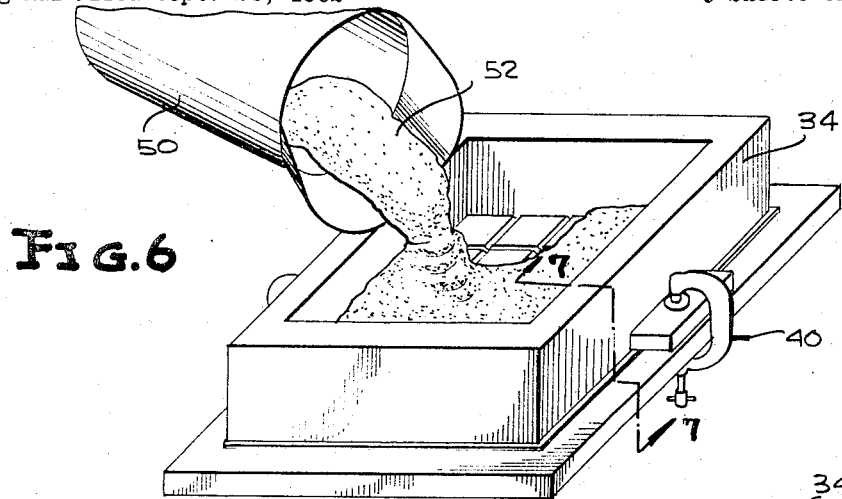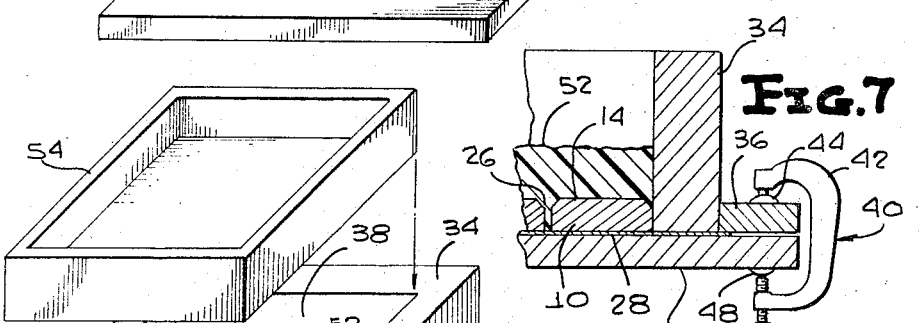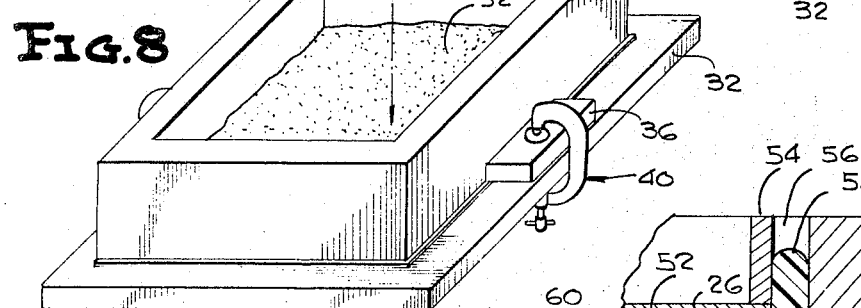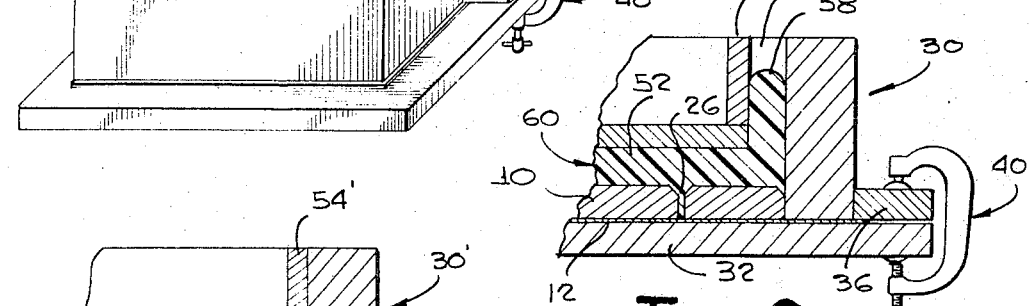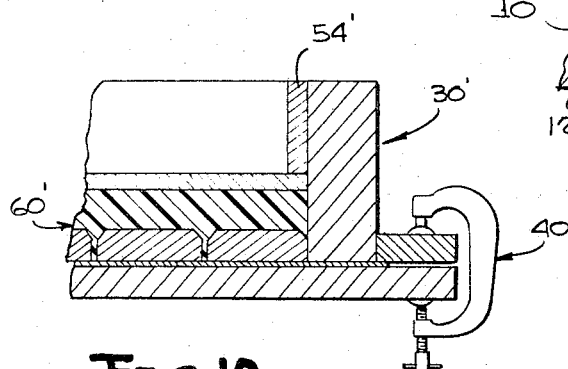

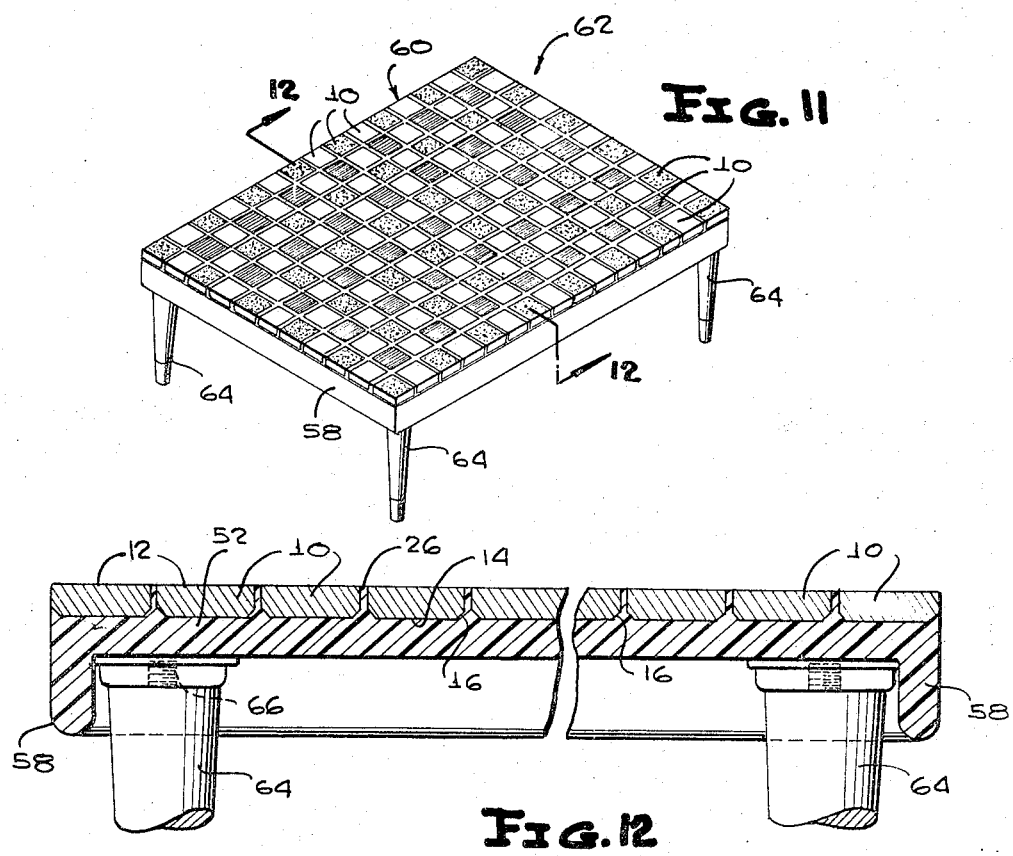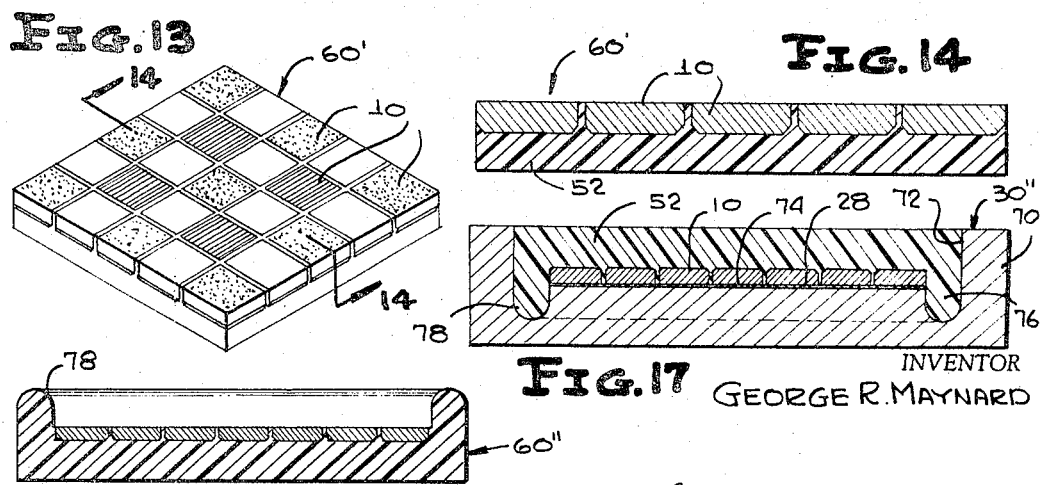

United States Patent Office 3,349,158
Patented Oct. 24, 1967

3,349,158
METHOD AND APPARATUS FOR
MAKING MOSAICS
George R. Maynard, Baltimore, Md., assignor to Pandora
Custom Craft, a partnership of Maryland
Continuation of applications Ser. No. 225,779, Sept. 24,
1962, and Ser. No. 433,845, Feb. 10, 1965. This application June 2, 1966, Ser. No. 554,913
2 Claims. (Cl. 264—261)

ABSTRACT OF THE DISCLOSURE

The method of making the mosaics includes the steps of dumping a quantity of blocks into a shallow frame having a smooth bottom surface, then arranging the blocks on said smooth surface in spaced relation and in a desired configuration with their front sides or faces uppermost, then applying an adhesive carrying sheet over the faces of the blocks so arranged and securing the sheet to the blocks, then removing the sheet with the blocks secured thereto and placing them on a smooth surface with the sheet in face contact with said surface; then applying a mold around the periphery of the blocks and pouring a liquid binder over the upwardly facing rear surface of the blocks. When the binder hardens the sheet is removed from the face of the blocks.

---

This application is a continuation of application Serial No. 225,779 filed Sept. 24, 1962 and application 433,845, filed Feb. 10, 1965, both now abandoned, for Process for Making a Composite Tile Structure.

This invention relates to a novel method or process of making mosaics and more particularly a method for arranging or organizing a plurality of bodies in a desired configuration and then applying a bonding material to the same to permanently bond the bodies together in the completed mosaic.

Briefly, the invention comprises a process or method for making a composite structure or mosaic, which comprises the steps of placing a plurality of blocks loosely in a frame structure upon a supporting or bottom surface upon and over which the blocks may be freely moved around, then arranging the blocks in a desired configuration on such surface within the frame structure with the front sides or faces uppermost, applying an adhesive carrying sheet of material such as paper, paper tape, woven tape or the like over such faces of the blocks so as to maintain the blocks in the desired proper arrangement or relationship, then lifting the sheet of material together with the blocks as a unit and inverting the unit and placing it on a flat surface with the sheet material down and the backs or reverse sides of the blocks facing upwardly, then applying a frame or mold around the periphery of the blocks, pouring a liquid binder over the blocks, then leveling the exposed top surface of the binder, curing the binder to a hardened state, removing the blocks with the hardened binder and the sheet attached thereto from the mold and then separating the sheet from the blocks, whereby the blocks with the hardened bond form a hard substantially rigid composite mosaic structure usable for flooring, table tops and other purposes.

It is accordingly the primary object of the present invention to provide a new and novel method for making a composite structure, more particularly a composite mosaic structure or attractive character for both decorative and utilitarian uses.

Another and important object of the invention is to provide a method of producing a mosaic structure, which can be rapidly carried out by human hands so that the blocks or bodies making up the mosaic can be arranged in a minimum of time and with a minimum of effort into any desired pattern ready for the application of the bonding material to and over the reverse or rear sides of the assembled bodies.

More specifically, it is an object of the invention to disclose a new and novel method for making a composite mosaic structure composed of a plurality of blocks of tile or the like which may be of uneven thickness and irregular shape, but which when bonded together to form a composite structure by the novel process disclosed herein, produce a structure which has a smooth and attractive upper surface.

It is another object of the invention to provide or disclose a new and novel method for making a composite mosaic structure preferably composed of ceramic blocks, but also may be composed of blocks of other material.

It is another object of the invention to disclose a novel method for making a composite structure of the character stated whereby the structure may be formed with a downwardly extending peripheral flange so that it may be easily mounted on supporting surfaces such as table tops, and prevented from moving laterally in relation thereto.

It is another object of the invention to disclose a new and novel method of making a structure of the character stated which is simpler, requires less time and labor, and is therefore more economical and practical than previously known methods for making mosaics and like composite structures.

The invention will be best understood from a consideration of the following detailed description taken in connection with the accompanying drawings forming a part of the specification, wherein:

FIG. 1 is a perspective view of a pile of blocks such as may be used in the practice of the invention.

FIG. 2 is a perspective view of the block assembly frame.

FIG. 3 is a perspective view of the assembly frame shown in FIG. 2 with the blocks of FIG. 1 arranged in a desired order therein.

FIG. 4 is a perspective view similar to FIG. 3 but showing masking tape or an adhesive layer layer being applied to and over the faces of the blocks.

FIG. 5 is a perspective view showing the assembled blocks secured together by the masking tape and being properly installed in or assembled with the mold.

FIG. 6 shows the assembled blocks within the mold shown in FIG. 5 and a liquid bonding material being applied to the back or reverse sides of the blocks.

FIG. 7 is an enlarged vertical cross sectional view taken substantially on the plane of line 7—7 in FIG. 6.

FIG. 8 is a perspective view of the mold shown in FIGS. 6 and 7 and illustrating how a piston or leveling device is used to level the exposed surface of the bonding liquid.

FIG. 9 is a vertical cross sectional view similar to FIG. 7 but showing the leveling device inserted into the mold.

FIG. 10 is a cross sectional view similar to FIG. 9 showing a modified leveling device inserted into the mold.

FIG. 11 is a perspective view showing the completed mosaic or composite structure mounted on the surface of a table.

FIG. 12 is an enlarged vertical cross sectional view taken substantially on the plane of line 12—12 in FIG. 11.

FIG. 13 is a perspective view of a composite structure made by the mold and leveling device shown in FIG. 10.

FIG. 14 is a vertical enlarged cross sectional view taken substantially on the plane of line 14—14 in FIG. 13.

FIG. 15 is a perspective view of a template which may be used in the mold.

FIG. 16 is an enlarged vertical cross sectional view taken through a number of the blocks after they have been assembled on the adhesive tape and the spaces between the faces of the blocks and the tape have been filled with a powder.

FIG. 17 is a vertical cross sectional view similar to FIGS. 7 and 9, but showing a modified composite block assembly within a modified mold.

FIG. 18 is a vertical cross sectional view of the composite block assembly made by the mold of FIG. 17 and oriented to operative position.

Referring to the drawings wherein like reference numerals throughout the various figures indicate identical parts, and particularly to FIG. 1, a plurality of blocks 10 are illustrated which are suitable for use in the novel method disclosed herein. As illustrated, the blocks are square and each block has a flat face 12 parallel to a flat back 14. The periphery of the back of each block is provided with a bevel edge 16 which extends at a substantially 45° angle with the back 14. The blocks are preferably composed of some ceramic material, or glass. However, it is to be understood that blocks of any material may be employed in the method. Although the blocks illustrated in the drawings appear to have perfectly flat surfaces which are perpendicular and parallel to one another, in actual practice, it is to be understood that each block may vary considerably in thickness and the various surfaces thereof are not exactly parallel to one another or perpendicular to one another.

FIG. 2 illustrates an assembly frame 18 preferably composed of one or more sheets of Masonite or other material having a relatively smooth face, and of square, rectangular or other suitable configuration. A rectangular recess 20 is provided in the upper central portion of frame 18. The recess 20 is smaller than the outside periphery of the frame and has four vertical side walls parallel to the edges of the frame. The side walls 22 of recess 20 extend downwardly substantially one half the thickness of the frame and terminate in a flat bottom 24, provided by the smooth face of the selected sheet of material.

The first step in carrying out the method of the present invention is for the operator to pick up a number of the blocks in his hand and placed the blocks on the surface of the bottom 24.

The operator, with his hand, moves the blocks which are on top of one another to arrange the same quickly on the surface 24 and then the blocks that do not have the obverse sides or surfaces uppermost are, by hand, turned to that position, whereupon the operator is able, with his hand, due to the smooth surface of the bottom on which the blocks rest, to rapidly slide the blocks into any desired design arrangement and in side-by-side, or edge-to-edge, relation, as illustrated in FIG. 3.

As illustrated, the rectangular blocks are, or may be arranged in a plurality of parallel rows and in slightly spaced apart relation one with another whereby to provide grooves, recesses or spaces 26 therebetween. The blocks, due to the manner of producing or manufacturing the same, normally, and usually do, have a slightly irregular shape and consequently when the blocks are shifted into side by side relation the spaces 26 will be automatically formed or produced therebetween even though portions of the sides or side edges of the blocks are abutting or contacting one another.

As illustrated in FIG. 4, after the blocks are properly arranged within the frame 18, strips 28 of pressure sensitive flexible adhesive sheet or strip material such as masking tape, or other sheets or strips of material carrying a suitable adhesive and having a suitable tensile strength, are applied over the faces 12 of the blocks 10 in edge to edge abutting relationship. The strips of adhesive material are then pressed firmly into adhesive engagement with the faces 12 of the blocks 10.

FIG. 5 illustrates a two piece mold 30 comprising a flat rectangular bottom plate 32 and a hollow rectangular side wall structure 34. The side wall structure 34 is slightly smaller in width and length than the plate 32, and is provided with integral flanges, or ears, 36 projecting from the central portion of opposite sides thereof. The side wall structure 34 encloses a rectangular mold chamber 38 of the same size and shape as the rectangular recess 20. However, the vertical dimension of the side wall structure is substantially greater than the vertical depth of the recess 20.

The adhesive sheet 28 with the blocks 10 adhering thereto is removed from the frame 18 and inverted or turned 180° so that the adhesive sheet is below the blocks. The sheet 28 is then placed on the upper surface of the bottom plate 32 with the blocks 10 centered in relation to the bottom plate. The side wall structure 34 is then telescoped over the periphery of the blocks 10 so as to snugly enclose same and clamp the adhesive sheet 28 between the bottom plate and the bottom of the side wall structure as illustrated in FIGS. 6 and 7. A pair of adjustable C-clamps 40 are then inserted over the flanges 36 and the side edges of the bottom plate 32 as shown in FIGS. 6 and 7. Each C-clamp includes the usual C-shaped body 42 having an abutment plate 44 swivelly connected to the end of one leg and a clamp screw 46 threaded through the end of the other leg in axial alignment with the abutment 44. An abutment plate 48 is also swivelly connected to the inner end of the screw 46 directly opposite the abutment plate 44. By screwing inwardly the screw 46, the flange 36 on each side of the side wall structure is urged toward the bottom plate 32 thereby clamping the adhesive sheet 28 tightly between the bottom plate 32 and the side wall structure 34. A container 50 containing a supply of liquid bonding material 52 such as polyester or epoxy resin is then employed as illustrated in FIG. 6 for pouring a supply of the liquid bonding material over the backs 14 of the blocks 10 so as to form a relatively thick layer of the bonding material. A die or piston 54 considerably smaller in width and length than the chamber 38 is then inserted downwardly into the chamber tightly into contact with the upper surface of the liquid bonding material 52. A rectangular space of equal thickness is provided between the die 54 and side wall structure 34 so that when the die 54 is pushed downwardly with sufficient force, some of the liquid bonding material 52 is forced upwardly into the space 56 thereby providing a rectangular flange 58. It is also to be noted that as the bonding material is placed under pressure, it is forced into the grooves 26 and into contact with the upper surface of the adhesive sheet 28 extending across the grooves. Also the faces 12 of blocks are forced flat against the upper surface of the adhesive sheet which is also forced flat against the upper surface of the plate 32. The liquid resin 52 is then allowed to harden by exposure to atmospheric drying or by heating. After the resins have sufficiently hardened, it effectively bonds the blocks 10 together so as to form an integral composite flat block assembly 60. The composite block, or mosaic, 60 is then removed from the mold structure in an obvious manner, and then the adhesive sheet is removed from the faces of the blocks 10.

FIGS. 11 and 12 illustrate one way of using the composite block assembly, or mosaic, to form a table. The table 62 illustrated in FIGS. 11 and 12 comprises merely the composite block assembly 60 with four conventional legs 64 secured in the four corners thereof by conventional means such as screws 66.

It is to be noted that the upper surface of the composite block assembly 62 is quite smooth and has a minimum of irregularities since the faces 12 of the blocks 10 are held in coplanar relationship by the pressure of the liquid 52 while in the mold 30. Of course, the blocks may be of different colors and arranged to form any desired artistic pattern.

FIG. 10 illustrates a modified mold 30' which is substantially the same as the mold 30 shown in FIG. 9 except that the die 54' is larger and completely fills the mold chamber 38. This eliminates the rectangular flange 58 and causes the bottom of the composite block assembly 60' to be perfectly flat and parallel to the upper surface thereof.

FIGS. 13 and 14 illustrate the composite block assembly 60' made in the mold 30' of FIG. 10. This block assembly has many obvious uses such as for use in constructing flooring, table tops, counter tops, etc.

Another modified mold 30" is illustrated in FIG. 17 and comprises a member of desired shape or contour, or block 70 preferably of rectangular shape, and having a rectangular opening or recess 72 formed in the top portion thereof. The recess 72 has a rectangular bottom 74 which is preferably flat but smaller in size than the opening 72. The bottom 74 is connected to the side walls of the recess 72 by a rectangular trough 76 which is U-shaped in cross section. After the blocks 10 are removed from the frame 18, with the sheet 28, in assembled relationship, the free edge portions of the adhesive sheet 28 are cut off flush with the outer edges of the block assembly as shown in FIG. 17. The assembly of blocks 10 and sheet 28 are then placed on the flat bottom 74 so that the outer peripheral edge portions of the block assembly is flush with the inner peripheral wall of the trough 76. The backs of the blocks are covered, and the recess 72 including the trough 76 is filled, with a liquid bonding material 52.

After the bonding material has hardened, it, along with the blocks, is removed from the mold. The adhesive sheet 28 is then removed whereby the bonding matrial 58 and blocks 10 form the desired mosaic 60" similar to the mosaic or assembly 60' shown in FIG. 13 except that the hardened binder extends beyond the periphery of the blocks and the periphery of the block assembly is provided with a rectangular flange 78 which is U-shaped in cross section. Thus, the block assembly 60" is suitable for use as table tops or counter tops wherein a peripheral upstanding flange thereon is desired.

In FIG. 15 is illustrated a template 80 which is suitable for use within the assembly frame 18. The template 80 is of rectangular configuration and preferably of the same size as the rectangular recess 20 in assembly frame 18. The template may be composed of paper or cardboard and is provided on its upper surface with a designed pattern comprising a plurality of squares 82 and 84 of different colors. The squares 82 and 84 are of the same size as, or slightly larger than, the blocks 10.

In use, the template 80 is placed within the recess 20 with the squares 82 and 84 facing upwardly. Then the operator merely covers each square 82 with a block of a corresponding color and each square 84 with a block of a different color corresponding to the color of the squares 84. Of course, squares of any number of colors arranged to provide any desired design may be formed or imprinted on the upper surface of the template. After the blocks have been arranged to completely cover the squares, the faces of the blocks are then covered by the adhesive sheet 28.

The method of the present invention is such as to have many desirable advantages over other known methods of producing mosaic structures. One very important advantage resides in the fact that the blocks can be rapidly placed or arranged in the desired or selected order in the tray or frame 18 due to the fact that the bottom of the frame is smooth and the blocks when placed thereon, and they may be just haphazardly, from one's hands, placed on the frame and slid around on the frame bottom into a single layer and any blocks that need turning over, so as to be placed on the frame properly, may be quickly turned over by hand and then slid around by the fingers of one's hand into the desired position.

The foregoing procedure is easily carried out in the use of the plain frame with the undecorated or unadorned surface of the bottom 24 or in the use of the template 80 the same procedure can be followed by shifting the blocks, by one's hand, over the surface of the template to the desired position.

These procedures eliminate the slow and tedious practice which has been heretofore followed of picking up each element which is to go into the mosaic, individually in the fingers and placing it in a desired location upon some form of adhesive film. This procedure not only requires that the operator be very meticulous to see that the block is laid down in the proper spot, which greatly slows down the operation, but the operation would be still further slowed down if it should become necessary to lift or remove a block or piece of material to another location.

It will be seen accordingly that the method of the present invention is particularly well adapted to mass production techniques.

By using the templates 80 within a plurality of assembly frames 18 or in using a number of assembly frames without employing the templates a large number of the frames may be quickly filled with the blocks 10 in the pattern or patterns desired.

The templates 80 are particularly useful when the assembly frames are filled with the blocks, as illustrated in FIG. 3, by handicapped people or persons having low artistic skill or mental ability.

Each assembly frame 18 may have securing means provided thereon such as a plurality of recesses in its upper face and a plurality of projecting dowels on its lower face whereby the frames may be stacked after being filled with tile blocks so that the dowels of one frame extend into the recesses of an adjacent frame so as to prevent the frames from separating laterally.

FIG. 16 is an enlarged cross sectional view showing several blocks 10 after they have been secured to the adhesive sheet 28 in the manner illustrated in FIG. 4. The blocks 10 are not perfectly square nor are their surfaces perfectly smooth, and the irregularities of these blocks have been illustrated on an exaggerated scale in FIG. 16. As shown in FIG. 16, the faces 12 of the blocks 10 may not be perfectly smooth and thereby having recesses, wrinkles or grooves 86 formed therein. It is sometimes impossible to force the adhesive surface of the sheet 28 against the faces of the blocks 10 so that the adhesive sheet will adhere to the entire surfaces comprising the faces 12. This is because it is extremely difficult if not impossible to cause the tape material, or sheet if of paper, or the like, to extend into some of the deeper grooves 86. Therefore, in order to prevent the liquid bonding material 52 from flowing into the grooves 86, dust or powder 88 such as dry cement or plaster of paris is blown into the grooves 86 via the spaces 26. The spaces 26 are then cleaned of the powder by brushing or light blowing. Thus, when the spaces 26 are filled with liquid bonding material, the powder 88 prevents the bonding material from flowing into the grooves or recesses 86. This is very important because once the grooves 86 become filled with bonding material that has hardened, it is almost impossible to remove and the faces of the blocks become permanently disfigured. Once the adhesive sheet has been removed from the blocks 10, after the bonding material is hardened, the powder 88 may be easily brushed or blown from the faces 12.

From the above, it is seen that not only does the adhesive sheet 28 serve to maintain the blocks 10 in assembled relationship, but also it serves to prevent the bonding material 52 from contacting and adhering to the faces 12 of the blocks.

It is also to be noted that it is not necessary to have the design on the template 80 indicated in different colors. For example, the design could be indicated by numbering the squares with different numbers whereby each number indicates a specific color. The template 80 may be maintained in position on the bottom 24 of the frame 18 by means of a nonhardening adhesive such as rubber cement so as to permit the template to be easily removed from the frame and replaced with one having a different design thereon.

Preferably, before the mold 30, 30' or 30" is used, the interior surfaces thereof are coated with some type of release coating such, for example, as wax to prevent the resin from adhering thereto. It is to be noted that the individual blocks 10 while being pressure coated with liquid resin are prevented from moving laterally in relation to one another and the mold because they are securely maintained in place by the strips of adhesive material 28. The material or sheet itself when used in molds 30 and 30' is maintained and secured in position by the clamping action between the side wall structure 34 and the plate 32 which are urged together by the clamps 40.

While the liquid resin 52 has been described as being compressed by the die 54, it is to be pointed out that if the resin is sufficiently low in viscosity, the die may be omitted since the top of the resin mass will flow to a perfectly level surface by force of gravity alone. Alternatively, the liquid binder may be sprayed on the backs of the blocks while they are secured to the adhesive sheet rather than being poured on.

Inasmuch as various changes may be made in the form, location and relative arrangement of the several parts without departing from the essential characteristics of the invention, it will be understood that the invention is not to be limited except by the scope of the appended claims.

I claim:

1. A method of making a composite mosaic like structure from a plurality of flat blocks of irregular shape, and which have top and bottom faces, which comprises the steps of first dumping a plurality of flat blocks into a shallow frame having a predetermined depth and a smooth bottom surface, said blocks being of varying thicknesses, the minimum thickness of which is at least equal to the depth of said frame, then arranging the blocks on said smooth bottom surface by hand in desired formation and in spaced relation, with their bottom faces in free engagement with the frame bottom, then applying and adhesively securing a sheet of flexible material over said top surfaces and having said sheet of a size to project beyond the outer sides of the outermost ones of the assembled blocks and to temporarily secure the blocks in the said spaced assembled relation, then removing the assembly of arranged blocks and the securing sheet material from the frame and inverting the entire assembly onto a flat surface of a support body with said sheet of flexible material between such surface and the blocks and projecting outwardly thereon beyond the outermost blocks, then placing a hollow form, having an open top and bottom, on the projecting part of the sheet of flexible material and in enclosing relationship with the assembled blocks and supported on the flexible material and the said support body, then securing the form and support body together and clamping the said projecting part of the sheet of flexible material therebetween, then introducing a flowable resinous bonding material into said hollow form and covering the uneven backs of the blocks in a substantial depth therewith and then forming the outer surface thereof into a planar face, the bonding material flowing between the blocks while the underlying material is held tightly in position to hold the blocks from shifting their position, then effecting the curing and hardening of the bonding material, then removing the bonded together blocks from the form, and lastly stripping off the flexible material.

2. A method of making a composite mosaic like structure from a plurality of flat blocks of irregular shape, and which have top and bottom faces, which comprises the steps of first dumping a plurality of flat blocks into a shallow frame having a predetermined depth and a smooth bottom surface, said blocks being of varying thicknesses, the minimum thickness of which is at least equal to the depth of said frame, then arranging the blocks on said smooth bottom surface by hand in desired formation and in spaced relation, with their bottom faces in free engagement with the frame bottom, then applying and adhesively securing a sheet of flexible material over said top surfaces and having said sheet of a size to project beyond the outer sides of the outermost ones of the assembled blocks and to temporarily secure the blocks in the said spaced assembled relation, then removing the assembly of arranged blocks and the securing sheet material from the frame and inverting the entire assembly onto a flat surface of a support body with said sheet of flexible material between such surface and the blocks and projecting outwardly thereon beyond the outermost blocks, then placing a hollow form, having an open top and bottom, on the projecting part of the sheet of flexible material and in enclosing relationship with the assembled blocks and supported on the flexible material and the said support body, then securing the form and support body together and clamping the said projecting part of the sheet of flexible material therebetween, then introducing a flowable resinous bonding material into said hollow form and covering the uneven backs of the blocks in a substantial depth therewith and then inserting into the hollow form a flat faced plunger, the dimensions of the flat face of the plunger being substantially the same as the inside dimensions of the hollow form thereby pressing the outer surface of the covering into a planar face, the bonding material flowing between the blocks while the underlying material is held tightly in position to hold the blocks from shifting their position, then effecting the curing and hardening of the bonding material, then removing the bonded together blocks from the form, and lastly stripping off the flexible material.

References Cited

UNITED STATES PATENTS

| | | | |
|---|---|---|---|
| 365,908 | 7/1887 | Chatin | 264—77 |
| 534,664 | 2/1895 | Polivka | 161—7 |
| 698,031 | 4/1902 | Leslie | 264—261 |
| 850,538 | 4/1907 | Newman. | |
| 985,353 | 2/1911 | Landis. | |
| 1,211,632 | 1/1917 | Shaw | 264—261 |
| 1,684,525 | 9/1928 | Tomarin | 264—247 |
| 2,781,554 | 2/1957 | Robinson | 264—261 |
| 2,807,070 | 9/1957 | Thomas | 264—277 |
| 2,814,836 | 12/1957 | Russel | 264—274 |
| 2,859,530 | 11/1958 | Renaud. | |
| 3,013,370 | 12/1961 | Vida | 264—261 |
| 3,131,514 | 5/1964 | Seik | 264—277 |

FOREIGN PATENTS

| | | |
|---|---|---|
| 275,307 | 9/1934 | Italy. |

ROBERT F. WHITE, *Primary Examiner.*

R. B. MOFFITT, *Assistant Examiner.*